US011176236B2

(12) United States Patent
Ekberg (10) Patent No.: US 11,176,236 B2
(45) Date of Patent: Nov. 16, 2021

(54) SECURE ACCESS TO RESOURCES (71) Applicant: Bitwards Oy, Espoo (FI)

(72) Inventor: Jan-Erik Ekberg, Espoo (FI)

(73) Assignee: Bitwards Oy, Espoo (FI)

( * ) Notice: Subject to any disclaimer, the term of this patent is extended or adjusted under 35 U.S.C. 154(b) by 143 days.

(21) Appl. No.: 16/011,703

(22) Filed: Jun. 19, 2018

(65) Prior Publication Data

US 2018/0367307 A1    Dec. 20, 2018

(30) Foreign Application Priority Data

Jun. 20, 2017   (EP) ..................................... 17176841

(51) Int. Cl.
| | |
|---|---|
| *G06F 21/33* | (2013.01) |
| *H04L 9/32* | (2006.01) |
| *H04L 9/08* | (2006.01) |
| *H04L 29/06* | (2006.01) |
| *H04W 12/06* | (2021.01) |
| *H04W 12/04* | (2021.01) |
| *H04W 12/082* | (2021.01) |

(52) U.S. Cl.
CPC .......... *G06F 21/335* (2013.01); *H04L 9/0816* (2013.01); *H04L 9/0894* (2013.01); *H04L 9/3213* (2013.01); *H04L 9/3236* (2013.01); *H04L 9/3271* (2013.01); *H04L 63/0807* (2013.01); *H04L 63/10* (2013.01); *H04L 63/101* (2013.01); *H04L 63/102* (2013.01); *H04W 12/04* (2013.01); *H04W 12/06* (2013.01); *H04W 12/082* (2021.01); *H04L 63/0492* (2013.01)

(58) Field of Classification Search
CPC ..... H04L 9/08–0897; H04L 9/32–3297; H04L 63/08–0892; H04L 63/10–108; H04L 63/0492; H04W 12/04–0471; H04W 12/06–069; H04W 12/08–088; G06F 21/30–35
See application file for complete search history.

(56) References Cited

U.S. PATENT DOCUMENTS

| | | | |
|---|---|---|---|
| 8,201,214 B1* | 6/2012 | Wallace .............. | H04L 63/0823 713/170 |
| 9,674,194 B1* | 6/2017 | McClintock .......... | G06F 21/604 |
| 9,819,672 B1* | 11/2017 | Machani ............... | H04L 63/083 |
| 2003/0128101 A1 | 7/2003 | Long | |
| 2003/0208386 A1* | 11/2003 | Brondrup ............... | G06Q 10/02 705/5 |
| 2010/0268649 A1 | 10/2010 | Roos et al. | |
| 2014/0365781 A1 | 12/2014 | Dmitrienko et al. | |
| 2018/0183771 A1* | 6/2018 | Campagna ............ | H04L 9/3268 |

\* cited by examiner

*Primary Examiner* — Madhuri R Herzog
(74) *Attorney, Agent, or Firm* — Laine IP Oy (57) ABSTRACT

According to an example aspect of the present invention, there is provided an apparatus comprising a memory configured to store a user key, a token relating to a resource, the token comprising the user key in encrypted form, and management data received in the apparatus from a server, and at least one processing core configured to participate in an access interaction with the resource, the access interaction being based at least partly on the token and the user key and the access interaction comprising first sending the management data to the resource and then completing the access interaction to access the resource.

19 Claims, 7 Drawing Sheets

Storing a user key and a token relating to a resource, the token comprising the user key in encrypted form, and management data received in an apparatus from a server — 610

Participating in an access interaction with the resource, the access interaction being based at least partly on the token and the user key and the access interaction comprising first sending the management data to the resource and then completing the access interaction to access the resource — 620

SECURE ACCESS TO RESOURCES

FIELD

The present invention relates to cryptographically secured access to resources, such as, for example, locks, vehicles or delivery boxes.

BACKGROUND

Resources may have value, wherefore they are often sought to be maintained secure. For example, a warehouse may be locked to prevent theft or sabotage of its contents, cars may be startable only with a suitable access credential, such as a key, such that the cars cannot be easily stolen.

Valuable resources may be utilized by their owners directly, as in the case of a personally owned vehicle, or access to resources may be delegated, for example, where a car rental service operates a fleet of cars, customers may be given keys that unlock and enable starting a specific car. Further, a person may lend his car to a family member, for example, by giving the family member the car keys.

Alternatively to physical keys, access codes may be used in securing access to resources, for example, a safe in a hotel room may be configured with a secret code, which unlocks the door of the safe. Likewise, an email account or encrypted file may be protected with a password or passphrase. Access to such a resource may be delegated by providing a copy of the password or passphrase to the delegate, with the consequence the delegate will have access that is equal to the access of the resource owner.

A yet further alternative is where resources are managed by resource lock devices, which are connected to a central server. Users may be provided with user-specific access dongles, which may comprise user-specific access codes and/or encryption keys. An operator may update the resource lock devices via a network connection between the resource lock devices and the central server, to inform the locks of users that are to be given access, or denied access.

Using the network connection, stolen or lost access dongles may be deactivated to prevent unauthorized persons from gaining access via the lock devices, for example.

SUMMARY OF THE INVENTION

According to some aspects, there is provided the subject-matter of the independent claims. Some embodiments are defined in the dependent claims.

According to a first aspect of the present invention, there is provided an apparatus comprising a memory configured to store a user key, a token relating to a resource, the token comprising the user key in encrypted form, and management data received in the apparatus from a server, and at least one processing core configured to participate in an access interaction with the resource, the access interaction being based at least partly on the token and the user key and the access interaction comprising first sending the management data to the resource and then completing the access interaction to access the resource.

Various embodiments of the first aspect may comprise at least one feature from the following bulleted list:
  the access interaction comprises sending the token to the resource, and processing a challenge received from the resource with the user key
  the management data comprises revocation data blacklisting at least one user from accessing the resource
  the apparatus is configured to participate in the access interaction without a simultaneous communication connection with the server
  the apparatus is configured to participate in the access interaction using a short-range wireless communications interface
  the token further comprises a delegation secret in encrypted form, and the apparatus is further configured to store the delegation secret in the memory in a form accessible to the processing core
  the apparatus is further configured to delegate access to the resource by providing to a user device the token, an index and a secret derived from the delegation secret in accordance with the index
  the apparatus is configured to derive the secret using a one-way function with the delegation secret and with the index
  the index comprises a plurality of parts, each one of the parts corresponding to one application of the one-way function in deriving the secret
  the apparatus is further configured to authenticate the user device before providing the secret to the user device.

According to a second aspect of the present invention, there is provided an apparatus comprising a memory configured to store a resource key, and management data, and at least one processing core configured to participate in an access interaction with a user device, the access interaction being based at least partly on a token and a key and the access interaction comprising first receiving the management data from the user device and then completing the access interaction to grant access to the user device.

Various embodiments of the second aspect may comprise at least one feature from the following bulleted list:
  the access interaction comprises receiving the token in the apparatus, decrypting the token using the resource key to obtain the key, the key comprising a user key, and verifying, using the user key, a response received in the apparatus from the user device
  the access interaction comprises receiving the token and an index in the apparatus, the token further comprises a delegation secret in encrypted form, and the apparatus is further configured to access the delegation secret after decrypting the token
  the apparatus is configured to derive the key using a one-way function with the delegation secret and with the index
  the index comprises plural parts, each one of the parts corresponding to one application of the one-way function in deriving the key
  the apparatus is further configured to store the index, and to deny a subsequent access attempt using the index
  the management data comprises revocation data blacklisting at least one user from accessing the apparatus
  the apparatus is configured to participate in the access interaction without a simultaneous communication connection with a server.

According to a third aspect of the present invention, there is provided a method in an apparatus, comprising storing a user key and a token relating to a resource, the token comprising the user key in encrypted form, and management data received in the apparatus from a server, and participating in an access interaction with the resource, the access interaction being based at least partly on the token and the user key and the access interaction comprising first sending the management data to the resource and then completing the access interaction to access the resource.

Various embodiments of the third aspect may comprise at least one feature corresponding to a feature from the preceding bulleted list laid out in connection with the first aspect.

According to a fourth aspect of the present invention, there is provided a method in an apparatus, comprising storing a resource key and management data, and participating in an access interaction with a user device, the access interaction being based at least partly on a token and a key and the access interaction comprising first receiving the management data from the user device and then completing the access interaction to grant access to the user device.

Various embodiments of the fourth aspect may comprise at least one feature corresponding to a feature from the preceding bulleted list laid out in connection with the second aspect.

According to a fifth aspect of the present invention, there is provided an apparatus comprising means for storing a user key and a token relating to a resource, the token comprising the user key in encrypted form, and management data received in the apparatus from a server, and means for participating in an access interaction with the resource, the access interaction being based at least partly on the token and the user key and the access interaction comprising first sending the management data to the resource and then completing the access interaction to access the resource.

According to a sixth aspect of the present invention, there is provided an apparatus comprising means for storing a resource key and management data, and means for participating in an access interaction with a user device, the access interaction being based at least partly on a token and a key and the access interaction comprising first receiving the management data from the user device and then completing the access interaction to grant access to the user device.

According to a seventh aspect of the present invention, there is provided a non-transitory computer readable medium having stored thereon a set of computer readable instructions that, when executed by at least one processor, cause an apparatus to at least store a user key and a token relating to a resource, the token comprising the user key in encrypted form, and management data received in the apparatus from a server, and participate in an access interaction with the resource, the access interaction being based at least partly on the token and the user key and the access interaction comprising first sending the management data to the resource and then completing the access interaction to access the resource.

According to an eighth aspect of the present invention, there is provided a non-transitory computer readable medium having stored thereon a set of computer readable instructions that, when executed by at least one processor, cause an apparatus to at least store a resource key and management data, and participate in an access interaction with a user device, the access interaction being based at least partly on a token and a key and the access interaction comprising first receiving the management data from the user device and then completing the access interaction to grant access to the user device.

According to a ninth aspect of the present invention, there is provided a computer program configured to cause a method in accordance with at least one of the third or fourth aspects to be performed.

According to a tenth aspect of the present invention, there is provided an apparatus comprising a memory configured to store a user key and a token relating to a resource, the token comprising the user key in encrypted form, and at least one processing core configured to participate in an access interaction with the resource, the access interaction being based at least partly on the token and the user key, wherein the token further comprises a delegation secret in encrypted form, and the apparatus is further configured to store the delegation secret in the memory in a form accessible to the processing core. In some variants of the tenth aspect, the apparatus is further configured to delegate access to the resource by providing to a user device the token, an index and a secret derived from the delegation secret in accordance with the index.

EMBODIMENTS

Described herein is a token-based system enabling offline access to a resource, wherein by offline it is meant that during an access interaction with the resource, neither the resource nor the accessing device need a connection to any further node, such as, for example a server. Expressed in other words, the offline access interaction is performed between two entities only, the resource and the user device. Further, token-based delegation of access rights is herein described in the context of the offline access system. The delegation may be based on a hash tree structure, for example.

Figure 1:
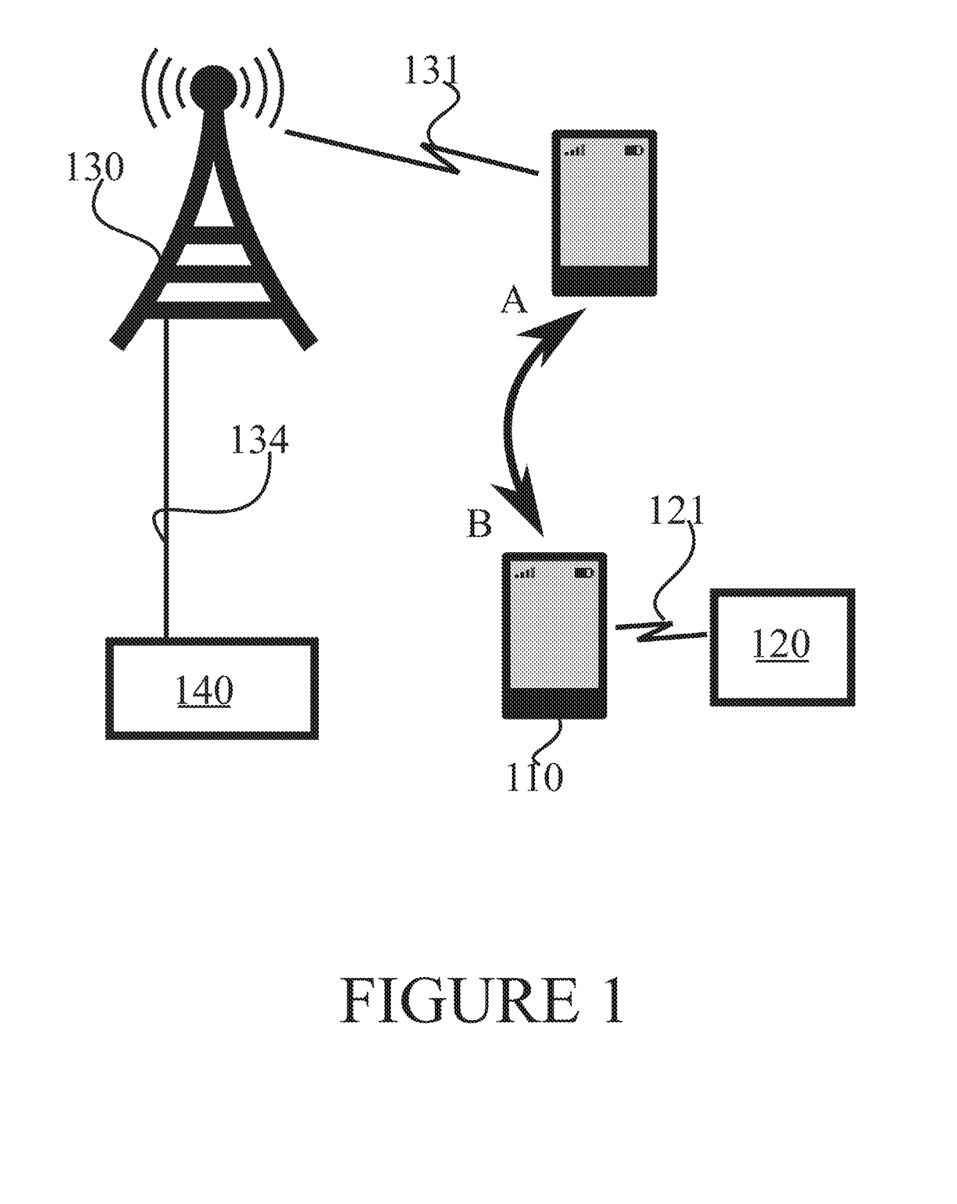
FIG. 1 illustrates an example system in accordance with at least some embodiments of the present invention.

FIG. 1 illustrates an example system in accordance with at least some embodiments of the present invention. Comprised in the system is user device 110, which may comprise, for example, a mobile phone, a smartphone, a tablet device, a smart watch, an item of smart jewelry or indeed another type of suitable electronic device. User device 110 will herein be referred to as device 110 for the sake of brevity. Further comprised in the illustrated system is resource 120. Resource 120 may comprise an electronic lock, an electronic lock controller, a vehicle, a postal locker locking device, a sharable utensil or a computer, for example. Resource 120 may be battery-powered, for example. Device 110 may be moved between schematically illustrated positions A and B in accordance with the two-pointed bent arrow.

Device 110 is enabled to communicate with server 140 when in position A. In the example of FIG. 1, device 110 can communicate with server 140 via cellular link 131, base station 130 and network connection 134. Connection 134 may traverse one or more than one network. Alternatively to a cellular connection, a non-cellular connection may be employed. Examples of cellular technologies include long term evolution, LTE, and wideband code division multiple access, WCDMA. Examples of non-cellular technologies include wireless local area network, WLAN, and worldwide interoperability for microwave access, WiMAX. Where a non-cellular technology is used, base station 130 may be referred to as an access point rather than a base station, for example. In some embodiments, the connection toward server 140 from device 110 is not wireless, but wire-line.

Server 140 may provide to device 110 tokens for use in the access scheme described herein. For each resource that device 110 is granted access to, device 110 may be provided a token. The token may be encrypted with an encryption key of the resource the token relates to, to enable its use in accessing the resource as will be described herein. The key of resource 120 will be referred to as a resource key herein. The resource key may be held by server 140 and resource 120. The user device will thus not be enabled to access contents of the token, as the user device is not furnished with resource keys. Device 110 is arranged to store each token it is furnished with, for example in a memory or secure storage of device 110. A token may comprise a user key that relates to the user device and the resource. In connection with providing a token to device 110, server 140 may also provide the user key to device 110, such that device 110 gains access to the user key.

Further, server 140 may be configured to provide to device 110, and/or other user devices, management data that relates to resources to be managed. For example, management data may comprise information of users or tokens that are to be blacklisted and prevented from accessing the resource in question, and/or the management data may comprise other information, such as additional constraints concerning access. Additional constraints may comprise, for example, that a certain token or user, or all tokens or users, can only access the resource at certain times of day. Constraint data may be present in tokens as well. Where constraint data is present in both a token and in management data, an access may need to satisfy all the constraints, in the token and in the management data, to proceed.

Device 110 and resource 120 are arranged to communicate with each other via link 121 when device 110 is in position B. Link 121 may comprise a suitable short-range communication interface, such as near-field communication, NFC, or Bluetooth for example. When a user wants to access resource 120, for example to pass through a door locked by resource 120, he may present device 110 for an access interaction with resource 120. The access interaction may be conducted over link 121. While device 110 may be capable of communicating with base station 130 also in position B, device 110 need not, in at least some embodiments, communicate with base station 130 when interacting with resource 120 to obtain the benefits of the present invention.

When the user seeks to access resource 120, he may move device 110 to within communication range of link 121, for example to position B of FIG. 1, or otherwise trigger the access interaction with resource 120. In the access interaction may be comprised two phases, a management phase and an access phase. The management phase, where present, may precede the access phase. In the management phase, device 110 provides any management data intended for resource 120 it may have received from server 140. The access interaction may take place over link 121, for example. An authentication may precede the management phase, the authentication being based on a challenge-and-response process, for example. The challenge may be based on cryptographic information device 110 has, such as a token, for example. In some use cases, resource 120 may agree to participate in an management phase with device 110 even if, ultimately, the access phase leads to a conclusion that device 110 is denied access. Thus resource 120 may receive management data even from devices that do not get access.

An advantage of forcing the management phase to precede the access phase is obtained in avoiding a situation where user devices would discontinue the access interaction after being granted access to the resource in the access phase of the access interaction. The user might prefer to interrupt the access interaction after gaining access and before the management phase to save time or battery resources on device 110, for example. In an offline system, resource 120 may only be able to receive management data via management phases of access interactions, wherefore completing the management phase before the access phase ensures resources of the system remain in indirect contact with server 140.

Management data may be secured with the resource key, for example it may be encrypted and/or signed, to prevent device 110 from knowing the contents of the management data and to prevent device 110 from being able to modify the management data undetectably. In some embodiments, where resource 120, after the access interaction, realizes the management data was corrupt, resource 120 will thereafter refuse access to the user device that provided the corrupted management data. Resource 120 may realize the management data is corrupt by determining a cryptographic signature on the management data is invalid, for example. Resource 120 may thereafter provide an indication of this toward server 140 in a management phase of a subsequent access interaction, for example with a different user device. This different user device may forward the indication toward server 140 later, when this user device is again in contact with server 140.

In the access phase of the access interaction, device 110 may initially provide the token to resource 120. Resource 120, being in possession of the resource key used to encrypt the token by server 140, will decrypt the token to access the user key therein, and proceeds to issue a challenge to device 110. The challenge may take the form of a nonce, for example, which device 110 may sign using the user key, and provide the signed nonce to resource 120 for verification. Signing may comprise use of a hash-based message authentication code, HMAC, process, for example. Resource 120 may use its copy of the user key to verify the signature, and thus verify device 110 is in also possession of the user key. Alternatively, the challenge may comprise resource 120 generating a random value and encrypting it with the user key, providing the encrypted random value to device 110, and then verifying that device 110 provides back to resource 120 a correctly decrypted random value. As a yet further alternative, the challenge may comprise resource 120 generating a random value and providing it to device 120, which will encrypt it with the user key, and resource 120 subsequently decrypts the encrypted random value to check, that the original random value is obtained. In general, the challenge is used by resource 120 to verify device 110 has the user key.

In case the token comprises constraints relating to access of device 110 to the resource, resource 120 may verify that the constraints are complied with. As any such constraints are comprised in the encrypted token device 110 is not capable of decrypting, the user cannot remove constraints relating to his access to the resource. Constraints may relate to a time of day or a day of week, for example. For example, an employee may have only work-week access to a factory during office hours. Access attempts at other times may be refused and/or logged by resource 120.

Since the access interaction is based on token and challenge exchange, it does not need a live connection to server 140 at the time it is conducted. Likewise, where management data is provided, the management data may be pre-downloaded from the server, wherefore the management phase of the access interaction also does not require a live connection to server 140, resulting overall in an offline token-based access scheme.

The token provided to device 110 may further comprise a delegation secret in addition to the user key. Device 110 may also have a copy of the delegation secret, much like it has a copy of the user key. In other words, device 110 may have access to the delegation secret, which may be provisioned to device 110 in connection with providing the token and the user key to device 110, for example. In some embodiments, tokens not comprising delegation secrets do not support delegation. By delegation it is meant herein, that a user of device 110 may provide at least part of his access rights to resource 120 to another user. For example, where resource 120 corresponds to a car that the user can start using a token, the user may delegate access to the car to another user, as will be laid out herein below.

To perform a delegation, the user may provide, for example using a suitably secured communication pathway, the token to the user receiving the delegated access right, who will herein be referred to as the delegate. For example, the user may send the token to the delegate using email, secured email, a data carrier, or he may cause the token to be displayed on a screen of device 110 as a 2D barcode, for example, to allow a device of the delegate to machine-read the 2D barcode to thereby gain access to the token. As described above, the user cannot decrypt the token, since it is encrypted with the resource key. The delegate, who does not have the resource key, likewise cannot access the contents of the token.

In addition to providing the token, the user may provide to the delegate a delegation subsecret derived from the delegation secret, and an index. For example, device 110 may use a one-way function with the index to derive the delegation subsecret. Examples of one-way functions include cryptographic hash functions and functions based on elliptic curves. For example, the delegate may be provided a delegation subsecret which is an output of a one-way function, such that the index and the delegation secret are the inputs to the one-way function.

Since the one-way function, by definition, is difficult to reverse, the delegate will not be empowered to discover the delegation secret itself. Rather, in an access interaction with resource 120, the delegate will provide to resource 120 the token and the index. Resource 120 may then use the resource key to access the delegation secret in the token, and run the one-way function with the delegation secret and the index as inputs, to obtain a local copy of the delegation subsecret. A challenge may then be issued to the delegate based on the delegation subsecret. The challenge may take the form of a nonce, for example, which the delegate may sign using the delegation subsecret, and provide the signed nonce to resource 120 for verification. Resource 120 may use its copy of the delegation subsecret to verify the signature, and thus verify the delegate is in possession of the delegation subsecret. Alternatively, the challenge may comprise resource 120 generating a random value and encrypting it with the delegation subsecret, providing the encrypted random value to the delegate, and then verifying that the delegate provides back to resource 120 a correctly decrypted random value. In general, the challenge is used by resource 120 to verify the delegate has the delegation subsecret, similarly as in the case of the non-delegated access phase with the exception that the delegation subsecret is used, rather than the user key. After granting access, resource 120 may be configured to keep a record of the index, and deny further attempts to access the resource using the same token and index. Thus the scope of the delegation may be limited and the delegate does not gain perpetual access to the resource.

In some embodiments, deriving the delegation subsecret is performed in accordance with a hash tree having three layers. In detail, the index may be comprised of three indicators, the first one corresponding to sixteen possible first-level delegation subsecrets, a second one corresponding to sixteen possible second-level delegation sub secrets derived from each of the first-level delegation sub secrets, and finally a third one corresponding to 256 possible third-level delegation subsecrets derived from each of the second-level delegation subsecrets. The third-level delegation subsecrets are leaf nodes of the hash tree, and usable in authentication with a resource. In some embodiments, the first-level subsecrets and the second-level subsecrets are not as such usable in accessing the resource.

In deriving the third-layer delegation subsecret, for example, three invocations of the one-way function may be employed: a first invocation with the first indicator corresponding to the first-level delegation subsecret and the delegation secret, then a second invocation with the second indicator corresponding to the second-level delegation subsecret and the result of the first invocation, and then, finally, a third invocation with the third indicator corresponding to the specific third-level delegation subsecret and the result of the second invocation.

Thus, for example, where the user desires to grant a single access to the delegate, he may cause the delegate to be provided with the token, an index corresponding to one of the leaf nodes, and the corresponding third-level delegation subsecret. Once the delegate has been granted the access, the index corresponding to that leaf node may be stored in the resource as a used index, preventing granting of another access based on the same index.

As a second example of the three-layer hash tree, a user may choose to grant the delegate 256 accesses to the resource. In this case, the delegate will be provided the token, an index corresponding to a second-level delegation subsecret and the corresponding second-level delegation subsecret. The delegate will realize from the index, that he is in possession of a second-level delegation subsecret, and he can thereafter derive from the second-level delegation subsecret a new third-level delegation subsecret each time he seeks access to the resource, until the 256 leafs associated with the second-level delegation subsecret are exhausted, which exhausts the delegation.

As a third example of the three-layer hash tree, a user may choose to grant the delegate 4096 accesses to the resource. In this case, the delegate will be provided the token, an index corresponding to a first-level delegation subsecret and the corresponding first-level delegation subsecret. The delegate will realize from the index, that he is in possession of a first-level delegation subsecret, and he can thereafter derive from the first-level delegation subsecret a new third-level delegation subsecret each time he seeks access to the resource, until the 16*256=4096 leafs associated with the first-level delegation subsecret are exhausted, which exhausts the delegation.

A delegate in receipt of a delegation may, in some embodiments, delegate at least part of the delegation onward. For example, where the delegate has been delegated a first-level delegation subsecret, he may choose to delegate at least one of the second-level delegation subsecrets associated with this first-level delegation subsecret to a further person. Thus this person would be able to derive the leaf subsecrets associated with this second-level delegation subsecret. In general, a delegate may be enabled to delegate a part of his delegation to another user, by providing to this user a delegation subsecret derived from the delegate's delegation subsecret. Further, a corresponding index may be provided by the delegate, the index being based on the index received by the delegate.

A technical advantage of the three-layer hash tree lies in the memory requirements of resource 120, namely, the index of a leaf node in the hash tree consumes only four bits for the first-layer part, another four bits for the second-layer part, and eight bits for the third-layer part, adding up to sixteen bits, or two bytes. A resource device may store a large number of used indices, without requiring a large memory.

Figure 2A:
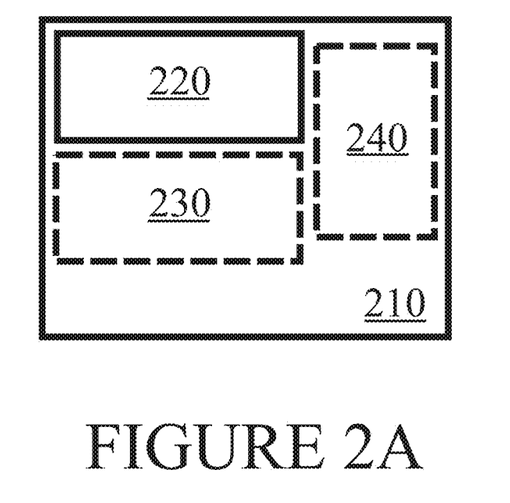
FIG. 2A illustrates a token in accordance with at least some embodiments of the present invention.

FIG. 2A illustrates a token in accordance with at least some embodiments of the present invention. Token 210 comprises therein a user key 220. The token 210 may optionally further comprise constraints 230, the constraints constraining access to be given based on the token, for example, as it relates to when the token may be used to access the resource the token relates to. Token 210 may optionally further comprise a delegation secret 240. The delegation secret and its operation have been described herein above. The token overall may be encrypted with a resource key, that is, a key of resource 120 that user device 110 does not possess.

Figure 2B:
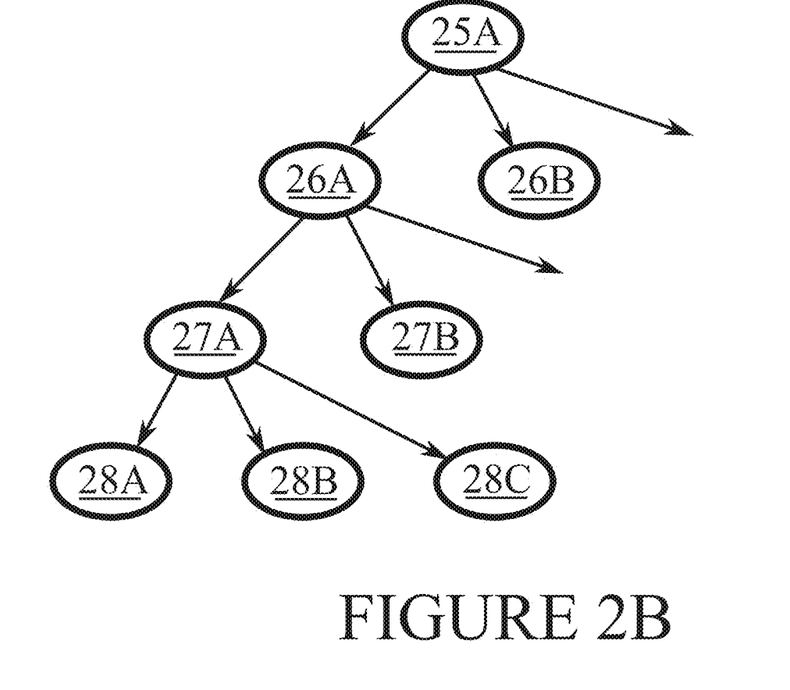
FIG. 2B illustrates a hash tree in accordance with at least some embodiments of the present invention.

FIG. 2B illustrates a hash tree in accordance with at least some embodiments of the present invention. At the top node 25A is the delegation secret, which is denoted with the reference numeral 240 in FIG. 2A. The first layer comprises first-level delegation subsecrets, in FIG. 2B first-level delegation subsecrets 26A and 26B are illustrated, although there may be sixteen first-level delegation subsecrets, for example, in total.

The second layer comprises second-level delegation subsecrets, in FIG. 2B second-level delegation subsecrets 27A and 27B are illustrated, although there may be, for example, sixteen second-level delegation sub secrets for each first-level delegation subsecrets of the first layer.

Finally, the third layer comprises third-level delegation subsecrets, also known as leaf nodes in this example. Leaf nodes 28A, 28B and 28C are illustrated in FIG. 2B, although there may be, for example, 256 leaf nodes for each second-level delegation subsecret.

In delegating access, device 110 may assume the role of a server granting access to resource 120, in other words, after initially provisioning the token, the server need advantageously not be contacted to delegate access, or to access the resource using either the original grant based on the user key, or using a delegated access right. Further, in some embodiments delegation is present but the management data is not necessarily used, in other words, some embodiments support the delegation but do not have a management phase in the access interaction.

Figure 3:
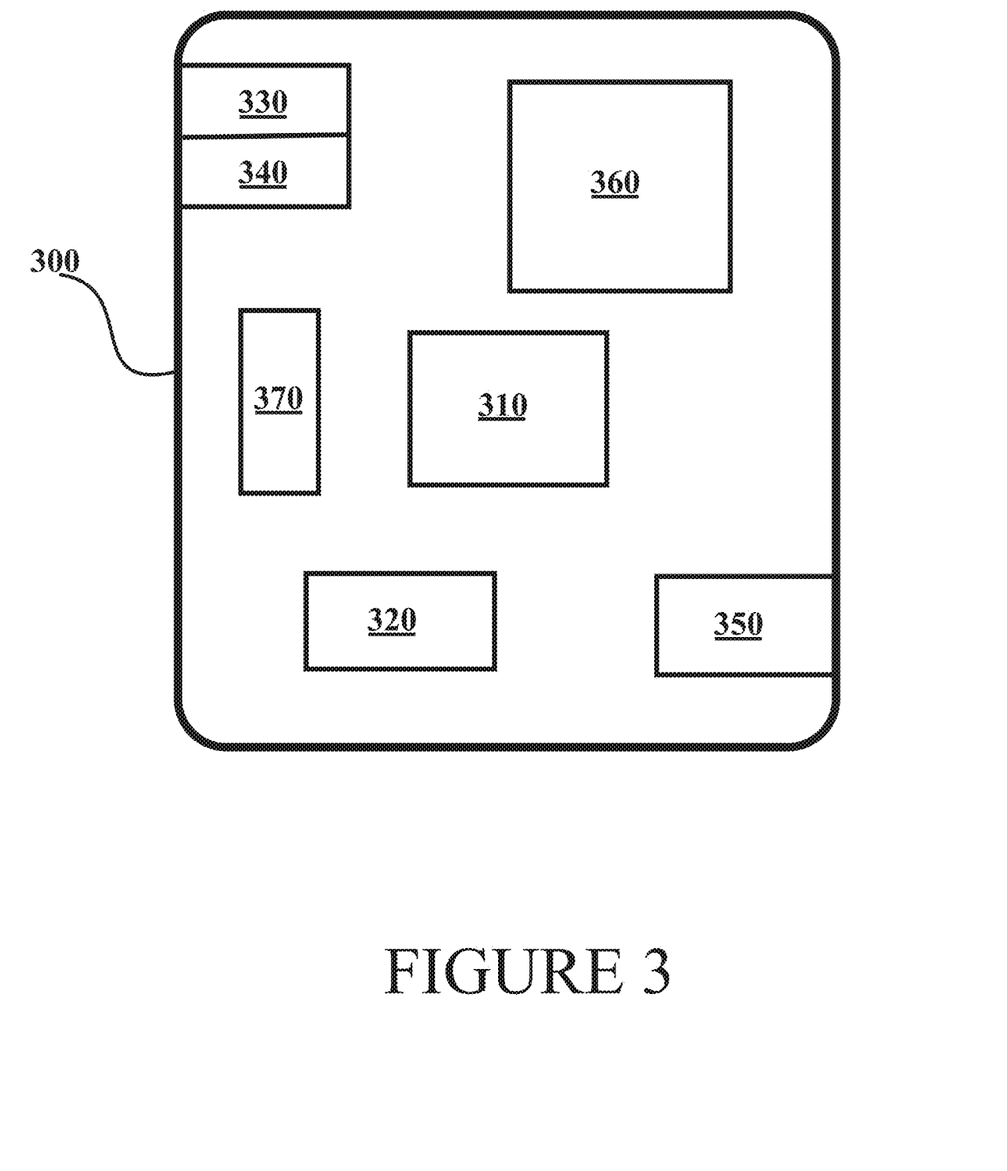
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, device 110 or, in suitable parts, resource 120 of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to delegate access rights to a delegate.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
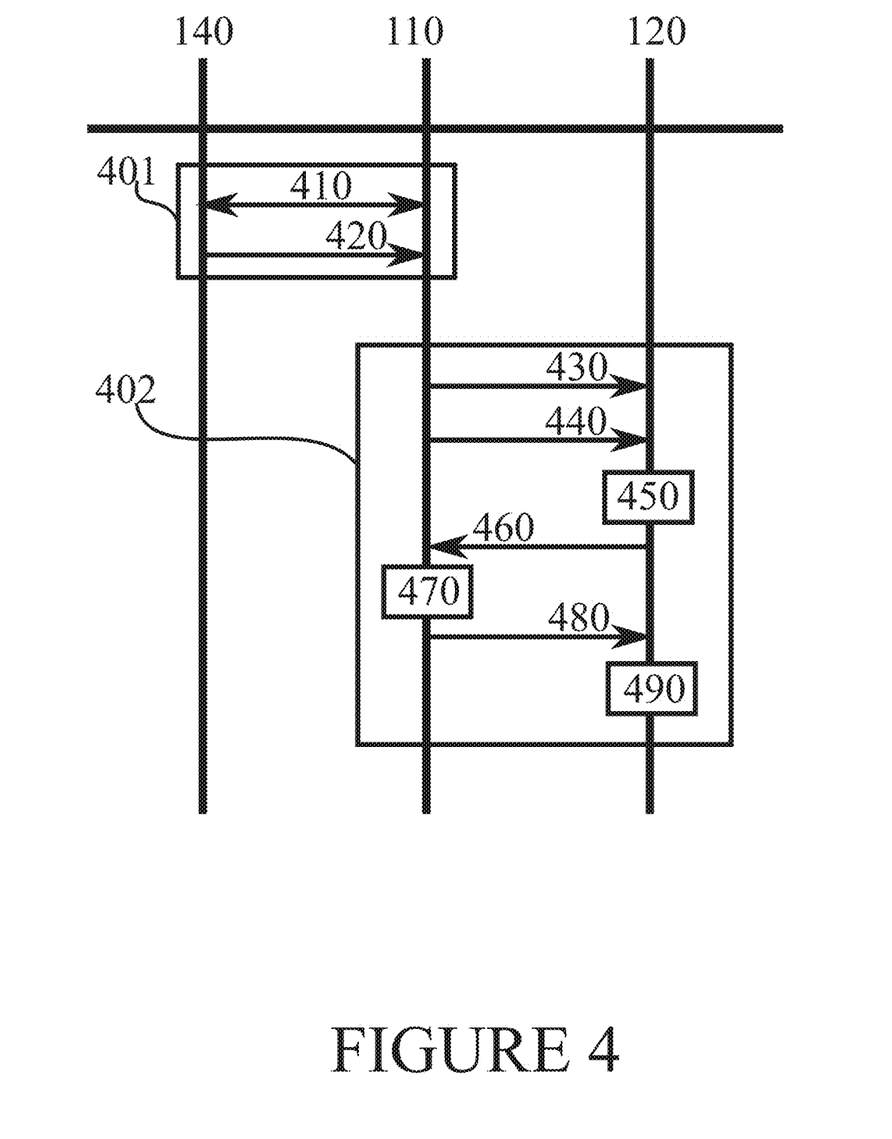
FIG. 4 illustrates signalling in accordance with at least some embodiments of the present invention.

FIG. 4 illustrates signalling in accordance with at least some embodiments of the present invention. On the vertical axes are disposed, on the left, server 140, in the middle, device 110 and on the right, resource 120. Time advances from the top toward the bottom.

During server interaction 401, device 110 is provisioned by server 140. An optional authentication phase 410 precedes provisioning phase 420, where server 140 provides to device 110 a token, a user key and, optionally, management data for resource 120 and/or a delegation secret. Server interaction 401 may take place over a suitable cellular or non-cellular, wireless or wire-line connection.

Later, an access interaction 402 takes place between device 110 and resource 120. A management phase 430 may precede the access phase, as described above. In management phase 430, device 110 may provide to resource 120 any management data received during server interaction 401.

In phase 440, device 110 provides to resource 120 the token. Resource 120, in phase 450, decrypts the token and prepares a challenge to device 110, which is transmitted from resource 120 to device 110 in phase 460. Responsively, in phase 470, device 110 prepares a response to the challenge, using the user key, and in phase 480 device 110 transmits the response to resource 120, which verifies the response, using the user key obtained from the decrypted token, in phase 490. Where the token comprises constraints, those may also be verified in phase 490, or, optionally, already in phase 450, where applicable.

Figure 5:
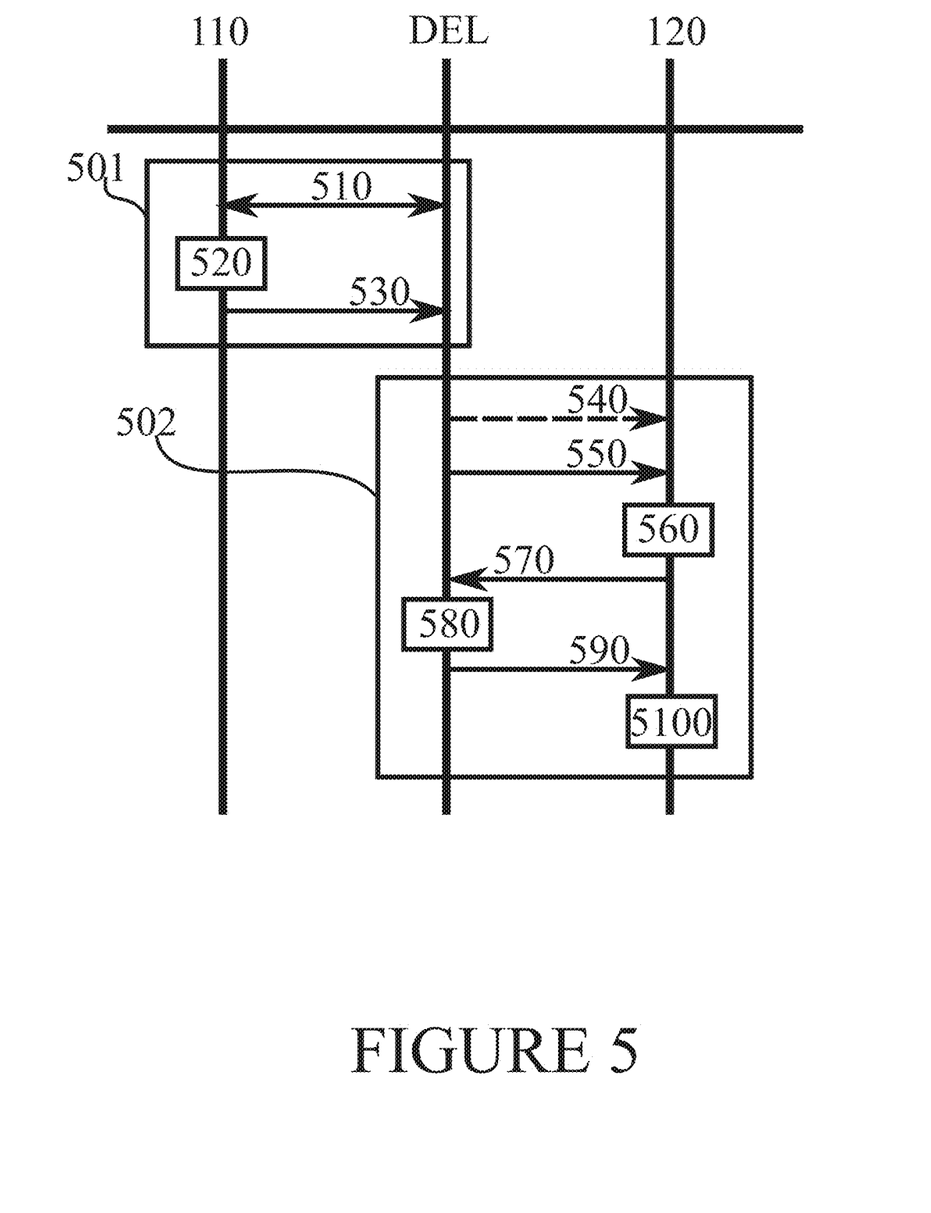
FIG. 5 illustrates signalling in accordance with at least some embodiments of the present invention.

FIG. 5 illustrates signalling in accordance with at least some embodiments of the present invention. The signalling of FIG. 5 relates to delegation of access rights. Delegating interaction 501 comprises the granting of access rights from device 110 to delegate DEL. Initially, the user having the access rights may authenticate the delegate in optional phase 510. An authentication method used may depend on the circumstances of the delegation. In phase 520 device 110 derives, using an index chosen in accordance with the desired type of delegation, from the delegation secret a suitable delegation subsecret, as described herein above. For example, to delegate a single access, a third-level delegation subsecret may be derived in accordance with a three-level hash tree. In phase 530, device 110 then provides to the delegate the token, the delegation subsecret and the index.

Subsequently to the delegation interaction 501, the delegate participates in an access interaction 502, which resembles the access interaction of FIG. 4. In detail, if the delegate has management data, this may be provided in an initial management phase 540. In some embodiments, delegates to not handle management data, in which case phase 540 will be absent.

In some embodiments, if the delegation subsecret received by the delegate in phase 530 is not a leaf node of a hash tree, the delegate may derive a leaf-node delegation subsecret in accordance with the received subsecret for use in access interaction 502. This derivation may also involve completing the index so that it refers to the leaf-node subsecret.

In phase 550, the delegate provides the token and the index to resource 120, which will then, in phase 560, decrypt the token to obtain the delegation secret, and derive the delegation subsecret from the delegation secret in accordance with the index.

Phase 570 comprises resource 120 issuing a challenge to the delegate, phase 580 comprises the delegate preparing a response to the challenge. The delegate provides the response to resource 120 in phase 590, and finally, in phase 5100, resource 120 verifies the response, using the delegation subsecret. The challenge-response process of phases 570, 580, 590 and 5100 resembles the challenge-response process of phases 460, 470, 480 and 490 of FIG. 4, except that in the delegation variant of FIG. 5, this process is based on the delegation subsecret, rather than the user key as in FIG. 4.

Figure 6:
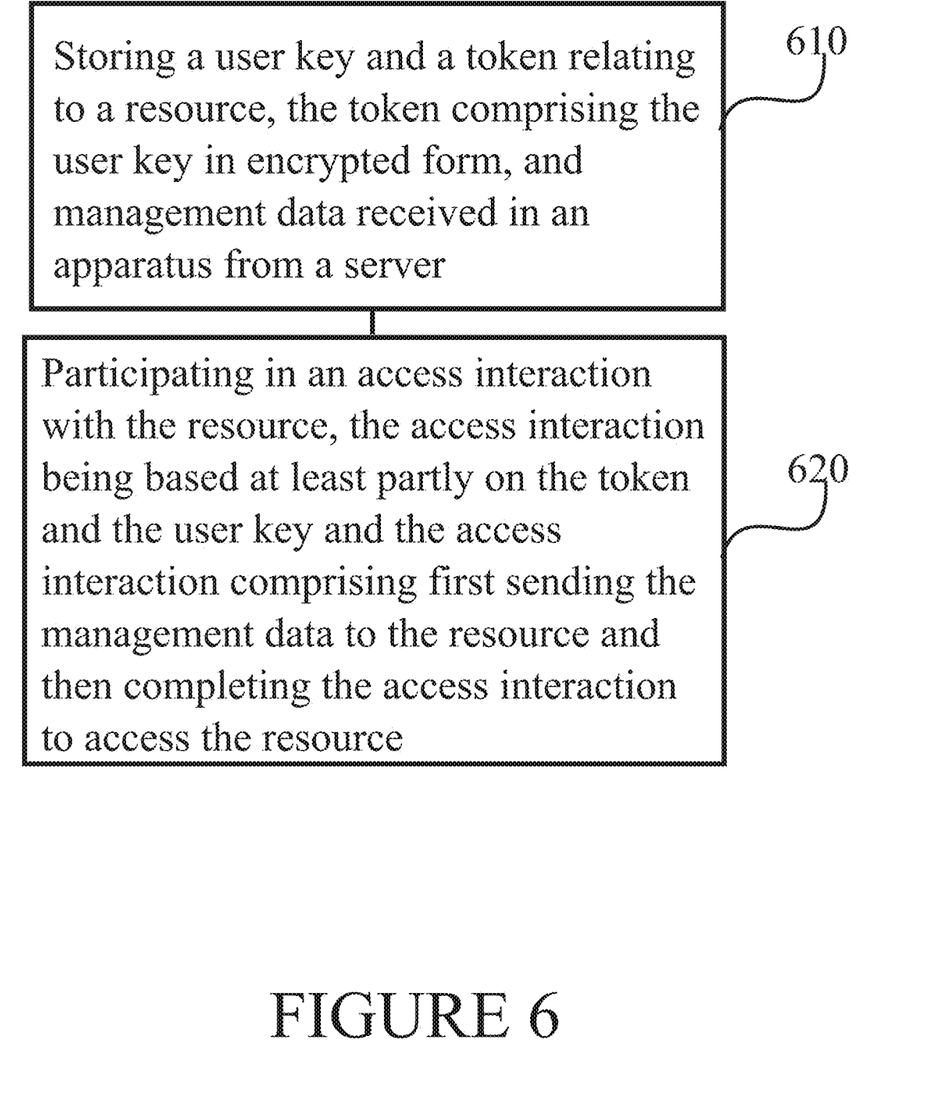
FIG. 6 a flow graph of a method in accordance with at least some embodiments of the present invention.

FIG. 6 is a flow graph of a method in accordance with at least some embodiments of the present invention. The phases of the illustrated method may be performed in device 110, an auxiliary device or a personal computer, for example, or in a control device configured to control the functioning thereof, when installed therein.

Phase 610 comprises storing a user key and a token relating to a resource, the token comprising the user key in encrypted form, and management data received in the apparatus from a server. Phase 620 comprises participating in an access interaction with the resource, the access interaction being based at least partly on the token and the user key and the access interaction comprising first sending the management data to the resource and then completing the access interaction to access the resource.

Figure 7:
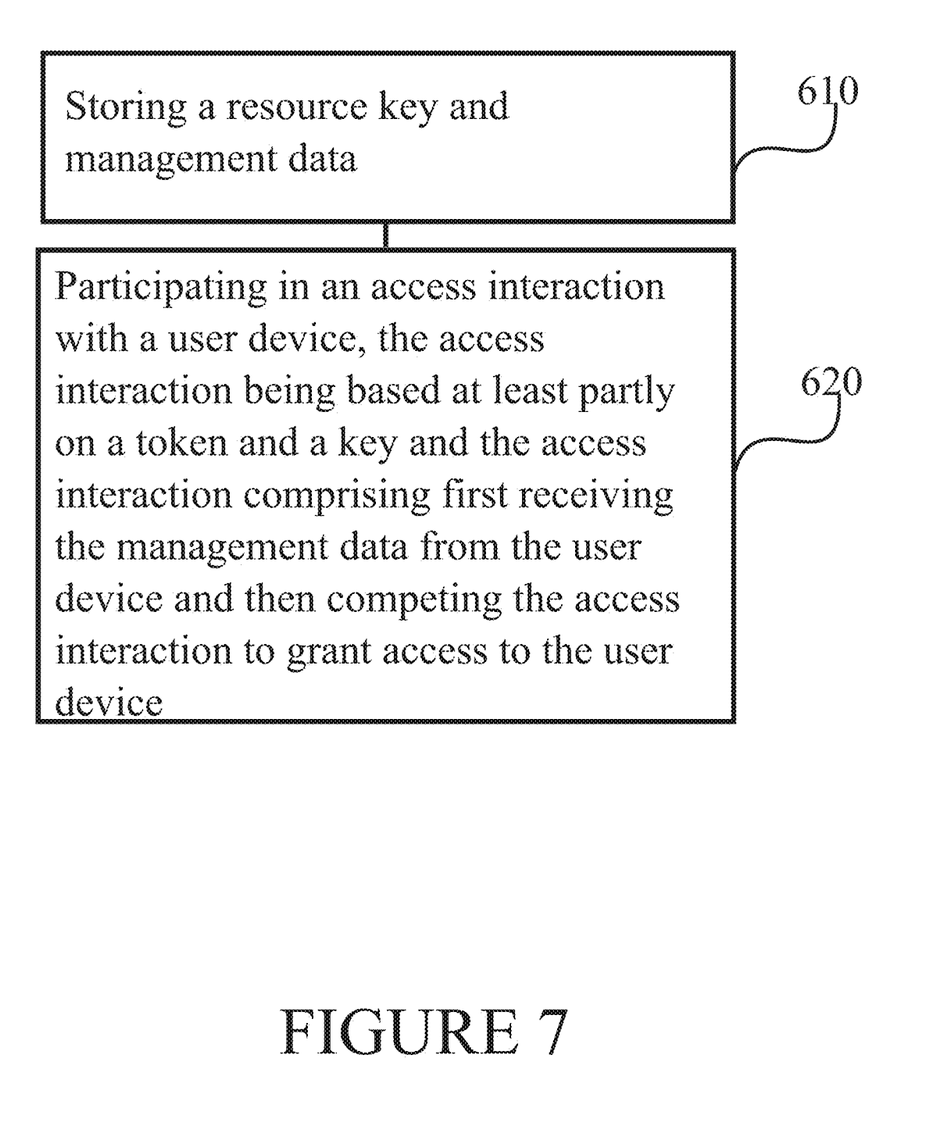
FIG. 7 is a flow graph of a method in accordance with at least some embodiments of the present invention.

FIG. 7 is a flow graph of a method in accordance with at least some embodiments of the present invention. The phases of the illustrated method may be performed in device 110, an auxiliary device or a personal computer, for example, or in a control device configured to control the functioning thereof, when installed therein.

Phase 710 comprises storing a resource key and management data. Phase 720 comprises participating in an access interaction with a user device, the access interaction being based at least partly on a token and a key and the access interaction comprising first receiving the management data from the user device and then completing the access interaction to grant access to the user device.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in providing an offline token-based access control scheme.

Acronyms List

HMAC Hash-based message authentication code
LTE Long term evolution
NFC Near-field communication
WCDMA Wideband code division multiple access
WiMAX Worldwide interoperability for microwave access
WLAN Wireless local area network

REFERENCE SIGNS LIST

| | |
|---|---|
| 110 | User device |
| 120 | Resource |
| 130 | Base station |
| 140 | Server |
| 121 | Link |
| 131 | Cellular link |
| 134 | Network connection |
| 210 | Token |
| 220 | User key |
| 230 | Constraints |
| 240 | Delegation secret |
| 25A | Delegation secret |
| 26A, 26B | First-level delegation subsecrets |
| 27A, 27B | Second-level delegation subsecrets |
| 28A, 28B, 28C | Third-level delegation subsecrets (leaf nodes) |
| 300-370 | Structure of the device of FIG. 3 |
| 401 | Server interaction |
| 402, 502 | Access interaction |
| 410-490 | Phases of signaling in FIG. 4 |
| 510-5100 | Phases of signaling in FIG. 5 |
| 610-620 | Phases of the method of FIG. 6 |
| 710-720 | Phases of the method of FIG. 6 |

The invention claimed is:

1. A user device comprising:
a memory configured to store:
  a user key;
  a token relating to a resource, the token comprising the user key in encrypted form, and
  management data received in the user device from a server, the management data comprising revocation data blacklisting at least two users other than a user of the user device or at least two tokens other than the token, preventing the at least two users or the at least two tokens from accessing the resource;
at least one processing core configured to:
  participate in an access interaction with the resource, the access interaction being based at least partly on the token and the user key and the access interaction comprising first sending the management data to the resource and then completing the access interaction to access the resource.

2. The user device according to claim 1, wherein the access interaction comprises sending the token to the resource, and processing a challenge received from the resource with the user key.

3. The user device according to claim 1, wherein the user device is configured to participate in the access interaction without a simultaneous communication connection with the server.

4. The user device according to claim 1, wherein the user device is configured to participate in the access interaction using a short-range wireless communications interface.

5. The user device according to claim 1, wherein the token further comprises a delegation secret in encrypted form, and the user device is further configured to store the delegation secret in the memory in a form accessible to the processing core.

6. The user device according to claim 5, wherein the user device is further configured to delegate access to the resource by providing to another user device the token, an index and a secret derived from the delegation secret in accordance with the index.

7. The user device according to claim 6, wherein the user device is configured to derive the secret using a one-way function with the delegation secret and with the index.

8. The user device according to claim 7, wherein the index comprises a plurality of parts, each one of the parts corresponding to one application of the one-way function in deriving the secret.

9. The user device according to claim 6, wherein the user device is further configured to authenticate the user device before providing the secret to the user device.

10. An apparatus comprising:
a memory configured to store:
a resource key, and
management data, the management data comprising revocation data blacklisting at least two users or at least two tokens, preventing the at least two users or the at least two tokens from accessing the apparatus;
at least one processing core configured to:
participate in an access interaction with a specific user device, a user of the specific user device not comprised in the at least two users, the access interaction being based at least partly on a token other than the at least two tokens and a key and the access interaction comprising first receiving the management data from the specific user device and then completing the access interaction to grant access to the specific user device.

11. The apparatus according to claim 10, wherein the access interaction comprises receiving the token in the apparatus, decrypting the token using the resource key to obtain the key, the key comprising a user key, and verifying, using the user key, a response received in the apparatus from the user device.

12. The apparatus according to claim 10, wherein the access interaction comprises receiving the token and an index in the apparatus, the token further comprises a delegation secret in encrypted form, and the apparatus is further configured to access the delegation secret after decrypting the token.

13. The apparatus according to claim 12, wherein the apparatus is configured to derive the key using a one-way function with the delegation secret and with the index.

14. The apparatus according to claim 13, wherein the index comprises plural parts, each one of the parts corresponding to one application of the one-way function in deriving the key.

15. The apparatus according to claim 12, wherein the apparatus is further configured to store the index, and to deny a subsequent access attempt using the index.

16. The apparatus according to claim 10, wherein the apparatus is configured to participate in the access interaction without a simultaneous communication connection with a server.

17. A method in user device, comprising:
storing a user key and a token relating to a resource, the token comprising the user key in encrypted form, and management data received in the user device from a server, the management data comprising revocation data blacklisting at least two users other than a user of the user device or at least two tokens other than the token, preventing the at least two users or the at least two tokens from accessing the resource, and
participating in an access interaction with the resource, the access interaction being based at least partly on the token and the user key and the access interaction comprising first sending the management data to the resource and then completing the access interaction to access the resource.

18. A method in an apparatus, comprising:
storing a resource key and management data, the management data comprising revocation data blacklisting at least two users or at least two tokens, preventing the at least two users or the at least two tokens from accessing the apparatus, and
participating in an access interaction with a specific user device, a user of the specific user device not comprised in the at least two users, the access interaction being based at least partly on a token other than the at least two tokens and a key and the access interaction comprising first receiving the management data from the specific user device and then completing the access interaction to grant access to the specific user device.

19. A non-transitory computer readable medium having stored thereon a set of computer readable instructions that, when executed by at least one processor, cause a user device to at least:
store a user key and a token relating to a resource, the token comprising the user key in encrypted form, and management data received in the user device from a server, the management data comprising revocation data blacklisting at least two users other than a user of the user device or at least two tokens other than the token, preventing the at least two users or the at least two tokens from accessing the resource, and
participate in an access interaction with the resource, the access interaction being based at least partly on the token and the user key and the access interaction comprising first sending the management data to the resource and then completing the access interaction to access the resource.

* * * * *